United States Patent
Unsin et al.

(10) Patent No.: US 10,927,907 B2
(45) Date of Patent: Feb. 23, 2021

(54) CONTROL METHOD OF AN ELECTROMAGNETIC BRAKE WITH A CONTROLLABLE ARMATURE DISC MOVEMENT

(71) Applicant: CHR. MAYR GMBH + CO. KG, Mauerstetten (DE)

(72) Inventors: Karl Unsin, Beckstetten (DE); Mathias Kramkowski, Steingaden (DE); Rudolf Rädel, Germaringen (DE)

(73) Assignee: CHR. MAYR GMBH + CO. KG, Mauerstetten (DE)

( * ) Notice: Subject to any disclaimer, the term of this patent is extended or adjusted under 35 U.S.C. 154(b) by 37 days.

(21) Appl. No.: 16/336,214

(22) PCT Filed: Sep. 18, 2017

(86) PCT No.: PCT/EP2017/073419
§ 371 (c)(1),
(2) Date: Mar. 25, 2019

(87) PCT Pub. No.: WO2018/065193
PCT Pub. Date: Apr. 12, 2018

(65) Prior Publication Data
US 2019/0226537 A1    Jul. 25, 2019

(30) Foreign Application Priority Data
Oct. 7, 2016   (DE) .................. 10 2016 119 027.6

(51) Int. Cl.
*F16D 59/02*      (2006.01)
*F16D 65/14*      (2006.01)
(Continued)

(52) U.S. Cl.
CPC .............. *F16D 59/02* (2013.01); *B60T 13/04* (2013.01); *B60T 13/748* (2013.01); *F16D 55/16* (2013.01);
(Continued)

(58) Field of Classification Search
CPC .......... F16D 59/00; F16D 59/02; F16D 55/16; F16D 65/14; F16D 63/002;
(Continued)

(56) References Cited

U.S. PATENT DOCUMENTS 4,334,205 A * 6/1982 Seilly .................... H01F 7/16
310/27
5,088,467 A * 2/1992 Mesenich .............. F02M 51/08
123/531
(Continued)

FOREIGN PATENT DOCUMENTS

DE    1149950 B    6/1963
DE    7142492 U    2/1972
(Continued)

OTHER PUBLICATIONS

International Search Report, Written Opinion and International Preliminary Report on Patentability for PCT Application No. PCT/EP2017/073419; dated Jan. 15, 2018.

*Primary Examiner* — Thomas J Williams
(74) *Attorney, Agent, or Firm* — Mendelsohn Dunleavy, P.C.; Steve Mendelsohn

(57) ABSTRACT

A method for controlling an electromagnetic brake (1) having a coil carrier (2), a solenoid (5), an armature disc (7), and at least one further force-exerting element. The internal and external poles (3, 4) of the coil carrier each have a front surface with a varying gradient that fits, in a complementary fashion, the front surfaces of the respective internal and external poles (8, 9) of the armature disc. The brake has an
(Continued)

air gap (11) which varies in size and forms a stroke region (21). When excitation occurs, the solenoid generates a magnetic force, and the force-exerting element generates an opposing force, wherein the ratio of the solenoid's magnetic force and the opposing force varies at least once between greater than and smaller than one during the movement of the armature disc in the stroke region owing to the variation of the excitation of the solenoid.

34 Claims, 10 Drawing Sheets

(51) Int. Cl.
*B60T 13/04* (2006.01)
*H01F 7/08* (2006.01)
*H01F 7/13* (2006.01)
*F16D 55/16* (2006.01)
*B60T 13/74* (2006.01)
*F16D 63/00* (2006.01)
*H01F 7/123* (2006.01)
*H02P 21/14* (2016.01)
*F16D 121/14* (2012.01)
*F16D 121/22* (2012.01)

(52) U.S. Cl.
CPC ........... *F16D 63/002* (2013.01); *F16D 65/14* (2013.01); *H01F 7/081* (2013.01); *H01F 7/123* (2013.01); *H01F 7/13* (2013.01); *H02P 21/141* (2013.01); *F16D 2121/14* (2013.01); *F16D 2121/22* (2013.01)

(58) Field of Classification Search
CPC .. F16D 2121/14; F16D 2121/22; B60T 13/04; B60T 13/74; B60T 13/748; H01F 7/081; H01F 7/123; H01F 7/13; H01F 7/08; H01F 7/16; H01F 7/1638; H01F 7/18; H02P 1/141
USPC .................................................. 188/166, 171
See application file for complete search history.

(56) References Cited

U.S. PATENT DOCUMENTS

| | | | | |
|---|---|---|---|---|
| 5,170,144 A | * | 12/1992 | Nielsen | H01F 7/13 |
| | | | | 156/272.2 |
| 6,196,361 B1 | * | 3/2001 | Russ | B64C 25/46 |
| | | | | 188/161 |
| 6,827,331 B1 | * | 12/2004 | Roos | F01L 9/04 |
| | | | | 251/129.15 |
| 7,626,288 B2 | | 12/2009 | Protze | |
| 8,757,586 B2 | * | 6/2014 | Gruen | H01F 7/13 |
| | | | | 251/129.15 |
| 2006/0017031 A1 | * | 1/2006 | Hofling | F16K 31/0606 |
| | | | | 251/129.07 |
| 2015/0204404 A1 | * | 7/2015 | Yoshioka | F16F 1/3665 |
| | | | | 267/166 |
| 2017/0016552 A1 | * | 1/2017 | Schlick | F16K 31/0693 |
| 2020/0208739 A1 | * | 7/2020 | Nakagawa | G01R 19/0007 |

FOREIGN PATENT DOCUMENTS

| | | |
|---|---|---|
| DE | 3024059 A1 | 1/1982 |
| DE | 4416500 A1 | 11/1995 |
| EP | 0876559 B1 | 3/2002 |
| WO | WO2005066982 A1 | 7/2005 |

\* cited by examiner

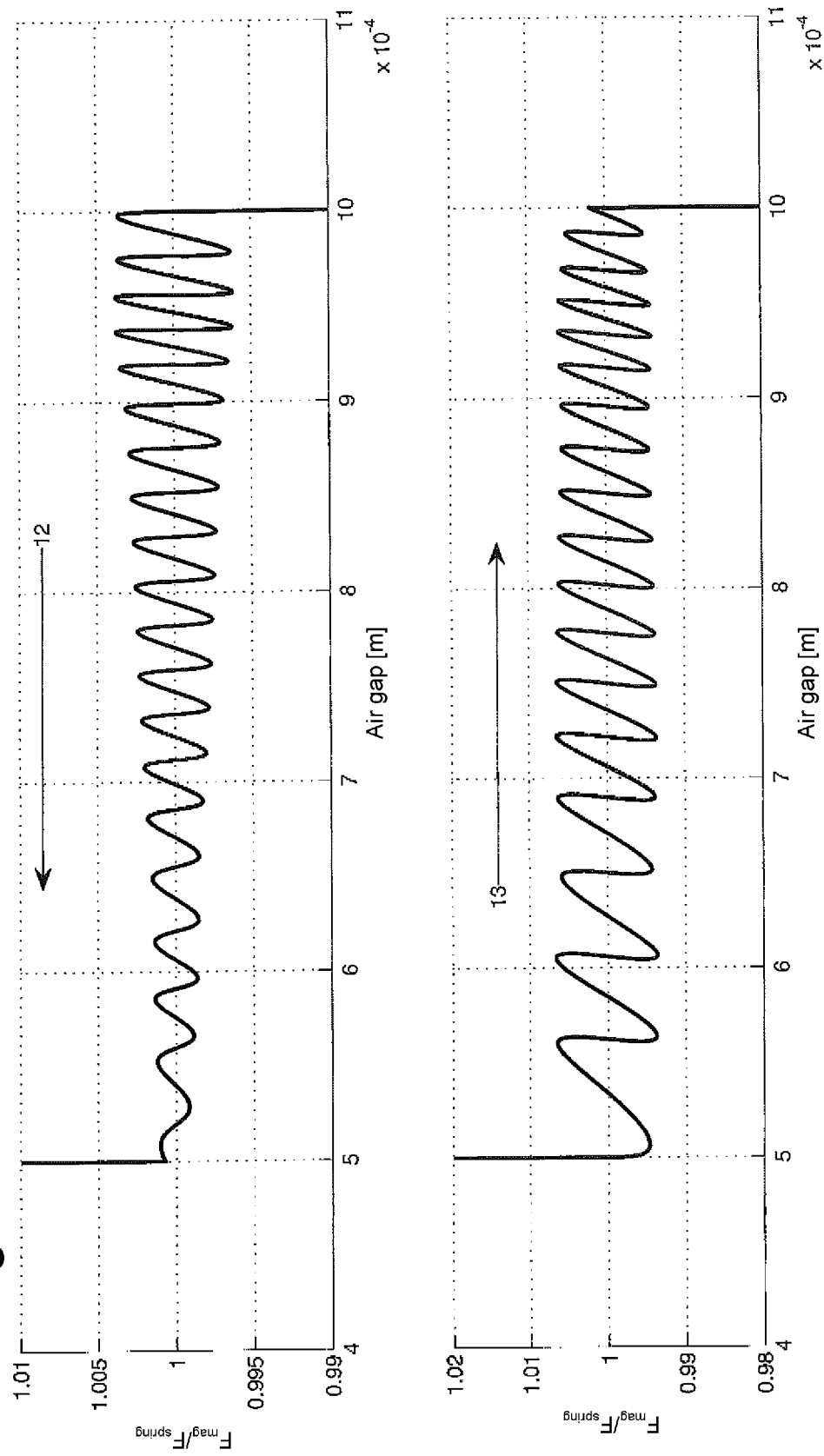

CONTROL METHOD OF AN ELECTROMAGNETIC BRAKE WITH A CONTROLLABLE ARMATURE DISC MOVEMENT

BACKGROUND

Field of the Invention

The present invention relates to a method for controlling an electromagnetic brake.

Description of the Related Art

The utility model DE 7142 492 discloses a brake release magnet in which the lifting magnet consists of an excitation coil, which is enclosed by the iron back for guiding the magnetic flux, and a plunger-type armature or armature piston, which is fixedly connected to a push rod for transmitting the magnetic forces. On its front face facing the piston, the pole core has two or more steps; the plunger-type armature also has two steps on the side facing the pole core 6. The two steps of the pole core and of the plunger-type armature match like a female and male part so that the plunger-type armature can be inserted into the pole core virtually without play. In this case, when the coil is electrically excited, a force acts on the piston. If the plunger-type armature travels a stroke, it strikes the pole core with its end wall. The stepped design of pole core and plunger-type armature results in a magnetic force/air gap characteristic curve which adapts to the load line.

DE 30 24 059 describes an electric lifting magnet with a solenoid which can be operated with direct current or alternating current, and a longitudinally displaceable armature and an opposite magnetic pole, wherein the facing sides of the armature and opposite pole have a step, in the region of which lines of force of the magnetic field accumulate. This construction results in a magnetic force stroke characteristic curve which has a maximum in the case of a small air gap and which shows a decreasing force in the case of an ensuing increasing air gap until the force shows a relative minimum with zero slope, and subsequently, the magnetic force increases further as the air gap increases.

DE 44 16 500 describes a DC lifting magnet. The aim is to realize the best possible lifting work in the smallest construction volume, wherein a suitable adaptation of the magnetic lifting force line to the demand characteristic curve is desired. In this case, the cylinder body and hollow cylinder body of the armature counterpart and armature have different respective lengths, wherein the entire lengths of the two hollow cylinder bodies and the two cylinder bodies of the armature and armature counterpart are equally large, and the armature and/or the armature counterpart can be moved toward one another and are equipped with an approximately centrally situated control/dual control cone or a stepped wall.

SUMMARY

The present invention relates to a method for controlling an electromagnetic brake, in particular a spring-loaded brake consisting inter alia of a coil carrier having at least one force-exerting element, for example at least one compression spring, at least one solenoid, and an armature disk, wherein the surfaces of the internal pole and the external pole on the coil carrier and the armature disk have a varying gradient. The speed of the movement of the armature disk in the stroke region of the spring-loaded brake becomes controllable via the change in the linked magnetic flux due to an existing negative feedback between the magnetic force of the solenoid and a second oppositely directed force of the at least one force-exerting element in the stroke region of the brake. The second force can be the spring force of at least one compression spring, for example. The negative feedback of the magnetic force and the spring force is generated on excitation of a magnetic field due to the pole surfaces with varying gradient on the coil carrier and the armature disk, whereby a decrease in the magnetic force is achieved in the case of small air gaps and an increase in the magnetic force is achieved in the case of large air gaps in comparison to a geometry without varying gradients of the pole surfaces.

In contrast to the related art, an object of the present invention is considered that of in controlling the movement of the armature disk in an electromagnetic brake such that the armature disk can be moved at an adjustable speed in the stroke region. The object is achieved with the features of the main claim. This is achieved by the ratio of magnetic force of the solenoid and the second force of the force-exerting element during the movement of the armature disk in the stroke region varying at least once between greater than and smaller than one due to the variation of the excitation of the solenoid.

On account of the pole surfaces with varying gradient on the coil carrier and the armature disk, a deformation of the magnetic force/air gap characteristic curves in comparison with magnetic force/air gap characteristic curves in a conventional spring-loaded brake (i.e. planar pole surfaces on the coil carrier and/or the armature disk) is generated at respectively constant linked magnetic flux when a magnetic field is excited. The magnetic force is thereby shifted from small air gaps to large air gaps. By this optimization of the magnetic force distribution, the known positive feedback of magnetic force and spring force during the movement of the armature disk can be replaced by a negative feedback of magnetic force and spring force. In a conventional spring-loaded brake, the magnetic force/air gap characteristic curves decrease at constant linked magnetic flux with an increasing air gap with a continuously decreasing function. In the case of a conventional spring-loaded brake, the armature disk thus respectively moves toward its open or closed position in the region of positive feedback of magnetic force and spring force. The armature disk is increasingly accelerated during the movement throughout the stroke region.

An advantage of the brake with the control method according to the invention is that, in comparison to the prior art, due to the optimized magnetic force distribution, a spring force increase with the same armature disk stroke is possible, namely by adapting the spring force/air gap characteristic curve to the magnetic force/air gap characteristic curve. This leads to a higher power density of the brake.

For a brake with varying pole surfaces, an advantageous possibility is to obtain a stably controllable armature disk movement and thus to be able to build an electronically damped brake without an external position signal of the armature disk (path sensors). In addition, the described influence of the armature disk movement, i.e., the damping, can be switched on and off or can be varied via the type of current feed (excitation of the solenoid) to such an extent that, depending on the requirements and area of application of the brake, a suitable setting can be selected, whereby either an optimized switching time, minimized brake noise, or an optimized braking torque, or a compromise of the stated objectives is possible.

Spring-loaded brakes known in the prior art with mechanical dampers, such as EP 0876 559 B1, have elastic rings as means for damping impacts, vibrations, and in particular noise. These rings are inserted into recesses of a mechanical element which, in comparison to another mechanical element, is oversized in order to generate a bias voltage. In comparison thereto, the invention has the advantage that the damping behavior of the brake is independent of the temperature and the service life of the dampers used. Furthermore, this invention dispenses with the time-consuming setting of the dampers in comparison to other spring-loaded brakes known in the prior art.

Another advantage is that the mechanical efficiency of the spring-loaded brake is improved, which is defined as the ratio of the energy used in the movement of the armature disk to the energy available magnetically in the stroke region. If a spring-loaded brake claimed for this method is compared in this respect to a conventional spring-loaded brake and the same magnetic force reserve is respectively used as the design criterion for the spring force at a previously defined stroke, the mechanical efficiency of a spring-loaded brake claimed for this method is always greater than in a conventional brake.

By the adjustable variation of the force ratio between spring force and magnetic force by means of the adjustable linked magnetic flux or current, it is possible to vary the braking torque given by the spring by increasing the magnetic force directed against the force of the springs, which leads to a relief of the friction surface, whereby the braking torque is reduced. The other possibility is to lower the magnetic force directed against the force of the springs, which leads to a further load on the friction surface, whereby the braking torque is increased.

A further advantage of the present invention in comparison to setting the braking torque of a conventional brake is that, as a result of the controllable movement of the armature disk and the thereby possible slow impingement of the armature disk on the brake lining, almost no immediate braking torque (torque peak) arises upon the armature disk impacting the friction lining, as is the case in a conventional brake.

Further advantageous details of the invention result from the dependent claims and from the description of the drawings mentioned below.

DESCRIPTION OF THE FIGURES

FIG. 2a shows the armature disk 7 of an electromagnetic spring-loaded brake 1 with an internal pole 8, an external pole 9, and optionally holders 10 for the compression springs 6, wherein the surfaces of the internal pole 3 and the external pole 4 in a preferred embodiment are designed as steps that fit, in a complementary fashion, the coil carrier 2 in FIG. 1a.

FIG. 5c shows the variation of the ratio of the magnetic force of the solenoid 5 to the spring force over an air gap interval for a movement of the armature disk 7 in the opening direction 12 and for a movement of the armature disk 7 in the closing direction 13, each in region B (negative feedback), which are to be regarded as a sequence of braking and acceleration cycles.

DETAILED DESCRIPTION

Figure 1A:
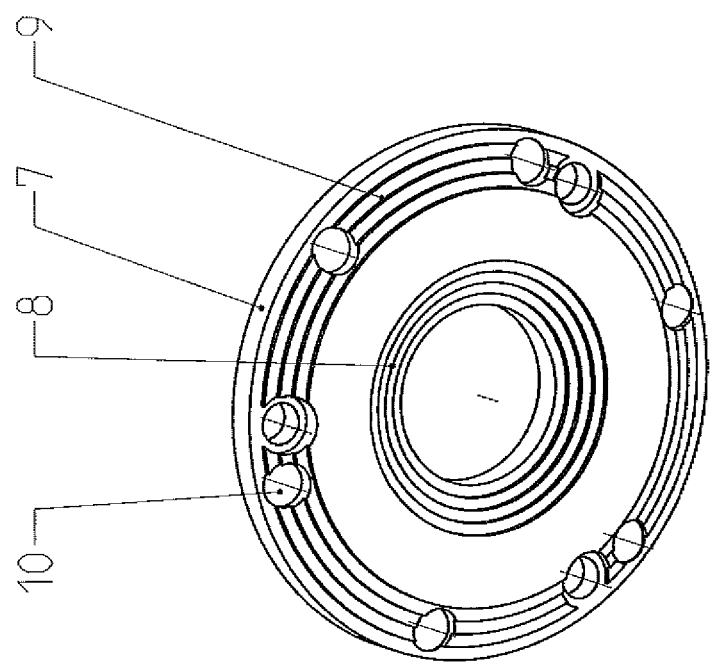
FIG. 1a shows the coil carrier 2 of an electromagnetic spring-loaded brake 1 with an internal pole 3 and an external pole 4, with a solenoid 5, and with compression springs 6 distributed on the coil carrier 2, wherein the surfaces of the internal pole 3 and the external pole 4 in a preferred embodiment are designed in steps.

As shown in FIG. 1a, a component of an electromagnetically released spring-loaded brake 1 is a coil carrier 2. The coil carrier 2 consists of an internal pole 3, a recess (coil space) which is preferably radially outwardly adjacent thereto and in which a solenoid 5 is located, and an external pole 4 preferably radially outwardly adjacent thereto. Furthermore provided on the coil carrier 2 are a plurality of compression springs 6 distributed as force-exerting elements, devices 6a for attaching further components of the brake, and spacer and guiding elements 6b. The front surfaces of the internal pole 3 and the external pole 4 of the coil carrier 2 have a varying gradient. The coil carrier 2 can preferably have a thickened circumferential rim radially adjacent to the external pole 4.

Figure 2A:
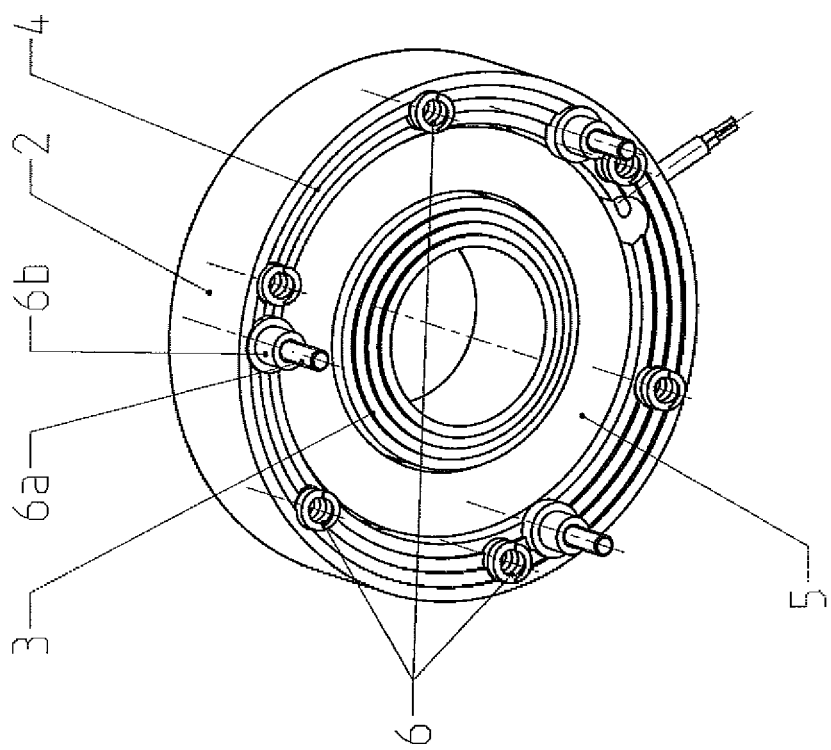

FIG. 2a shows an armature disk 7 as another component of a spring-loaded brake 1. The armature disk 7 consists of an internal pole 8 and has a planar surface preferably radially outwardly adjacent thereto, and an external pole 9 preferably radially outwardly adjacent thereto.

The armature disk 7 can also have holders 10 for receiving the compression springs 6 of the coil carrier 2 and openings for the attachment devices 6a of the coil carrier 2. The front surfaces of the internal pole 8 and the external pole 9 of the armature disk 7 have a varying gradient, wherein these surfaces preferably fit, in a complementary fashion, the gradients of the surfaces of the internal pole 3 and the external pole 4 of the coil carrier 2.

In a preferred embodiment, the varying gradients on the front surfaces of the internal pole 3 and the external pole 4 of the coil carrier 2 form one or more steps, wherein the edge of the step or the edges of the steps are formed parallel to the direction of movement of the armature disk 7. The steps can be formed in an ascending or descending manner both in the internal pole 3 and in the external pole 4 but preferably fit one another. In an alternative embodiment, the edge(s) of the step(s) of the coil carrier 2 have a shape angled toward the direction of movement of the armature disk 7. For the preferred embodiment and for the alternative embodiment, the armature disk 7 has a step shape that preferably fits, in a complementary fashion, the coil carrier 2 in the region of the internal pole 8 and the external pole 9.

In a further preferred embodiment, the varying gradients on the front surfaces of the internal pole 3, 8 and the external pole 4, 9 of the coil carrier 2 or of the armature disk 7 form one or more notches or projections. The armature disk 7 belonging to the coil carrier 2 is preferably designed to fit in a complementary fashion. In an alternative embodiment, the one or more notches or projections are concentrically distributed on the respective internal pole 3, 8 and the external pole 4, 9 of the coil carrier 2 or the armature disk 7.

Figure 2B:
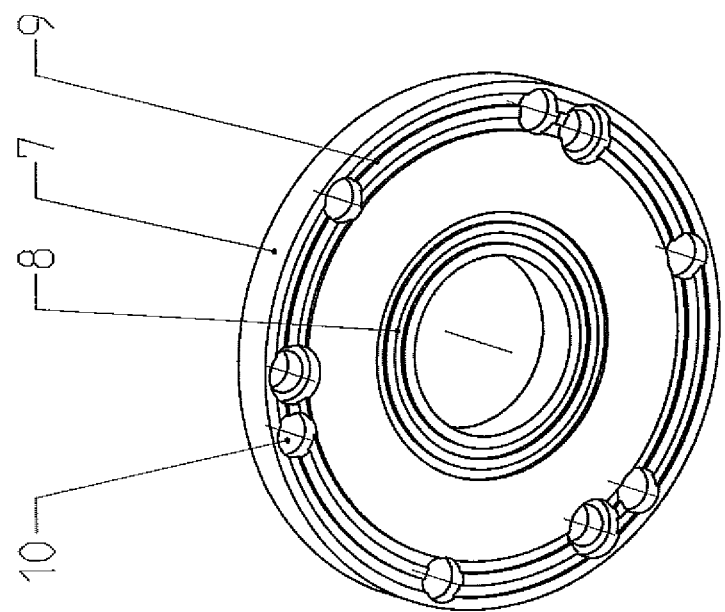
FIG. 2b shows the armature disk 7 of an electromagnetic spring-loaded brake 1 with an internal pole 8, an external pole 9, and optionally holders 10 for the compression springs 6, wherein the surfaces of the internal pole 3 and the external pole 4 in a further preferred embodiment are designed to fit, in a complementary fashion, the coil carrier in FIG. 1b.
Figure 1B:
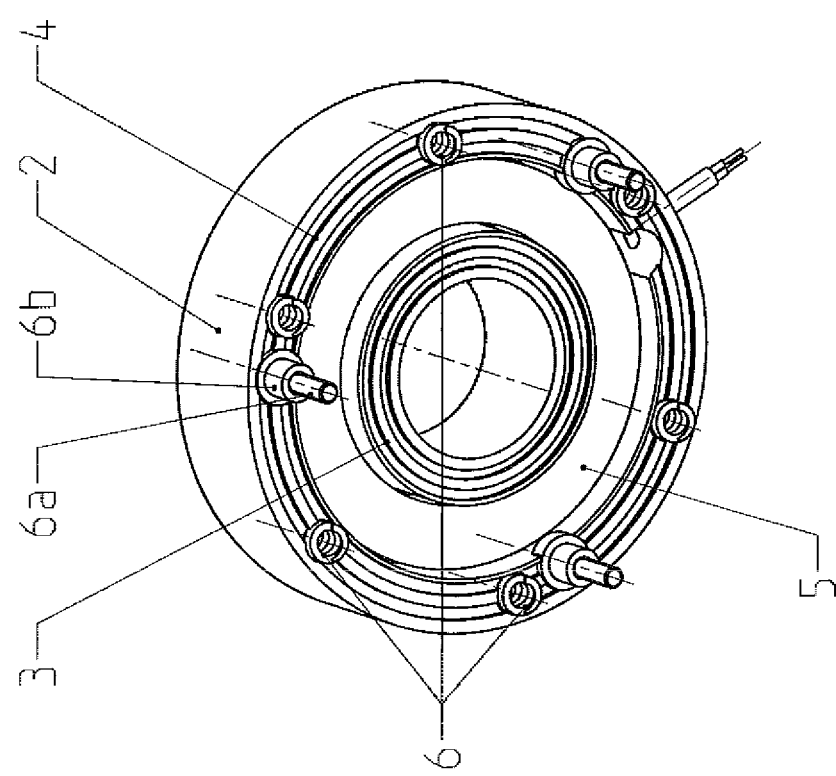
FIG. 1b shows the coil carrier 2 of an electromagnetic spring-loaded brake 1 with an internal pole 3 and an external pole 4, with a solenoid 5, and with compression springs 6 distributed on the coil carrier 2, wherein the surfaces of the internal pole 3 and the external pole 4 in a further preferred embodiment have the shape of grooves and projections extending annularly concentrically with the central axis of the spring-loaded brake 1.

In a further alternative embodiment, the front surfaces on the respective internal poles 3, 8 and the external poles 4, 9 of the armature disk 7 and of the coil carrier 2 can be designed in stepped fashion with notches or projections, wherein these notches or projections can in each case preferably be combined in a complementary fit. In addition, the varying gradients on the surface of the coil carrier 2 and the armature disk 7 can have the form of circles extending concentrically with the central axis of the spring-loaded brake, as shown in FIGS. 1b and 2b.

Figure 2C:
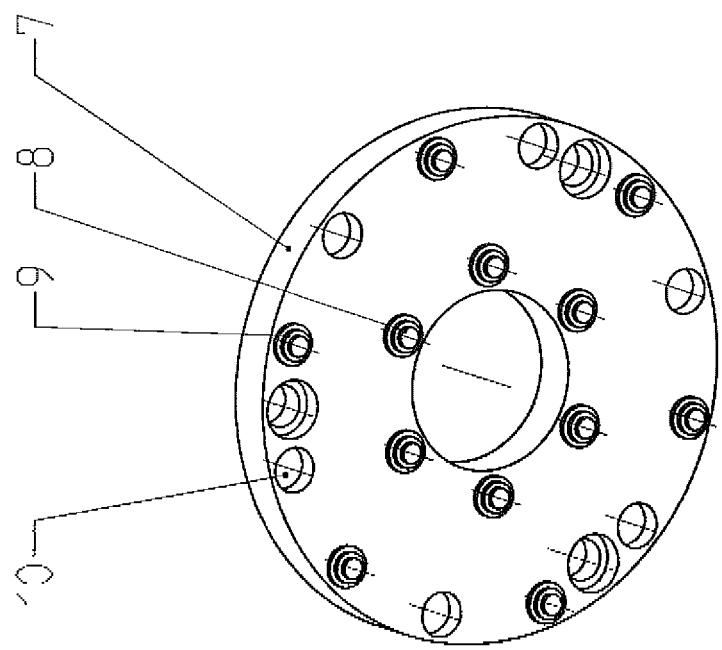
FIG. 2c shows the armature disk 7 of an electromagnetic spring-loaded brake 1 with an internal pole 8, an external pole 9, and optionally holders 10 for the compression springs 6, wherein the surfaces of the internal pole 3 and the external pole 4 in yet another preferred embodiment are designed to fit, in a complementary fashion, the coil carrier in FIG. 1c.
Figure 1C:
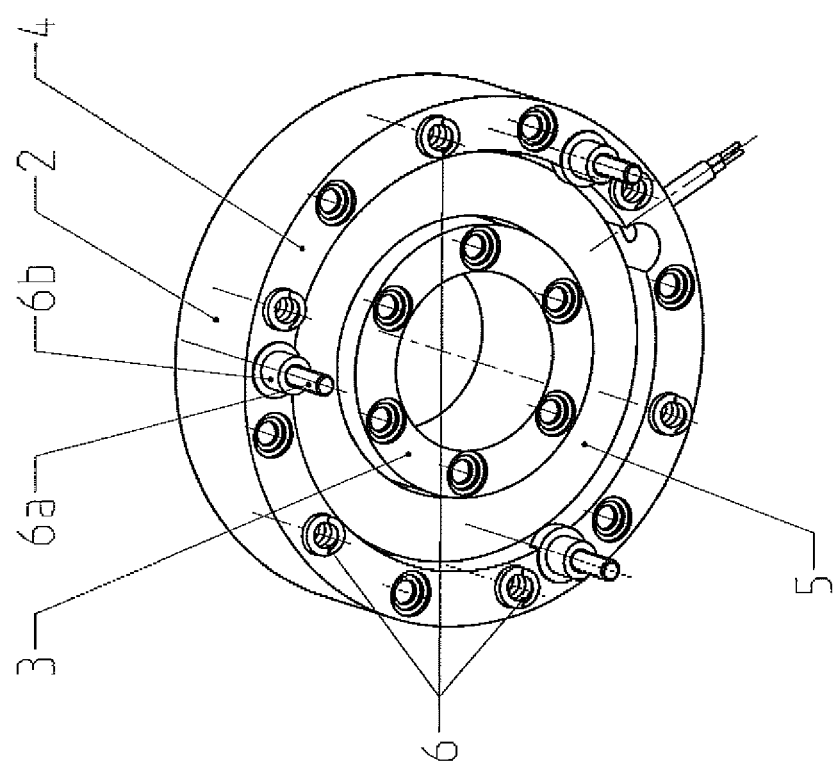
FIG. 1c shows the coil carrier 2 of an electromagnetic spring-loaded brake 1 with an internal pole 3 and an external pole 4, with a solenoid 5, and with compression springs 6 distributed on the coil carrier 2, wherein the surfaces of the internal pole 3 and the external pole 4 in yet another preferred embodiment are designed in the form of stepped bores arranged on a pitch circle concentric with the central axis.

In a further embodiment, the varying gradients on the pole front surfaces of the coil carrier 2 and the armature disk 7 can be arranged in the form of stepped bores on a pitch circle concentric with the central axis of the spring-loaded brake, as illustrated in FIGS. 1c and 2c.

In yet another embodiment, the varying gradients on the pole front surfaces of the coil carrier 2 and the armature disk 7 are arranged such that the contour of the front surfaces follows any geometry between the coil space and the outer contour of the coil carrier. In this case, the contour of the front surfaces can follow substantially parallel to the inner contour or the outer contour of the coil carrier and/or of the armature disk. In addition, the contour of the front surfaces can follow substantially parallel to the contour of the coil space of the coil carrier 2.

Alternatively, the electromagnetically released brake can also be designed as a permanent magnet brake, wherein in this case, the force-exerting element on the coil carrier 2 is at least one permanent magnet and the second force is the spring force of a return spring. In this case, the permanent magnet brake is opened by excitation of the solenoid so that the magnetic field of the permanent magnet is substantially neutralized. The armature disk can then be moved away from the coil carrier by means of a return spring, for example a leaf spring. By reducing the excitation of the solenoid, the resulting magnetic field of the permanent magnet and solenoid becomes stronger again, and the armature disk is moved into the closed position against the return spring.

Figure 3:
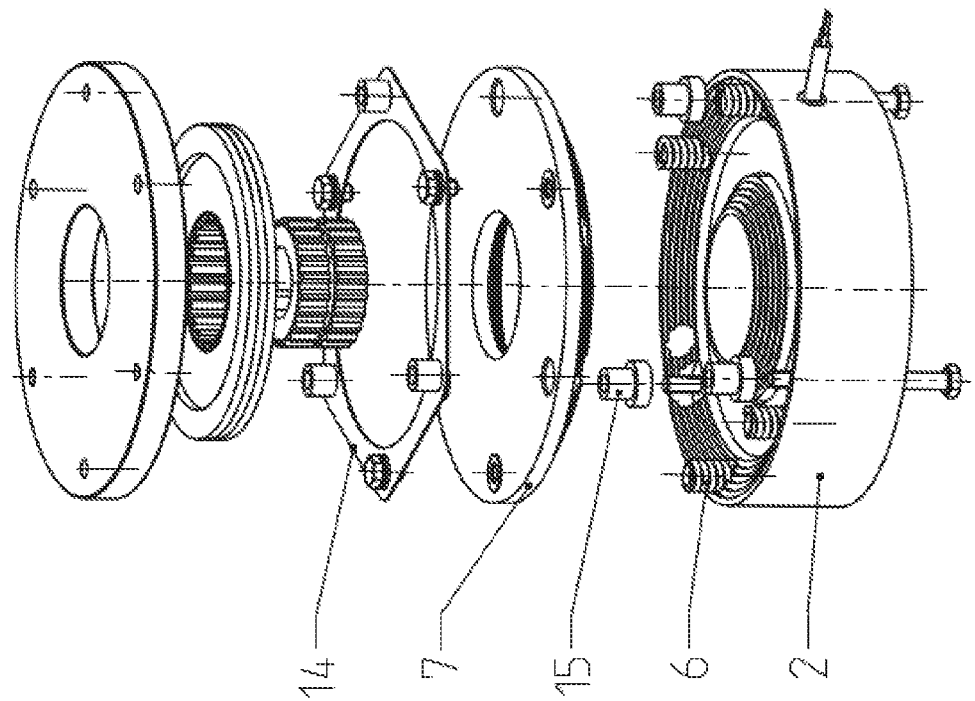
FIG. 3 shows a preferred embodiment of the mounted spring-loaded brake 1 with the coil carrier 2 and the armature disk 7, with an air gap 11 between the coil carrier 2 and the armature disk 7. Next to it, an exploded representation of the spring-loaded brake with a spring plate as a device for radial guidance 14 of the armature disk 7 and a spacer 15 are also shown.
Figure 3:
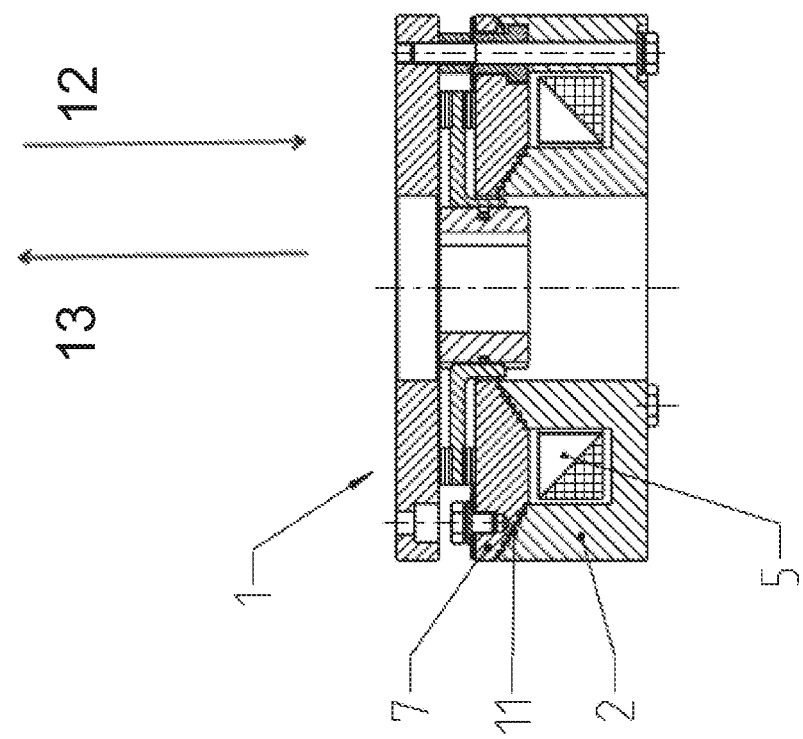

FIG. 3 shows a preferred embodiment of a mounted spring-loaded brake 1 with coil carrier 2 and armature disk 7, each having stepped surfaces in an assembled view and in an exploded view. An air gap 11 can also be seen which is defined as the average distance between the front surfaces of the internal poles 3, 8 and the external poles 4, 9 of the coil carrier 2 and the armature disk 7. In this respect, the surfaces of the bores on the pole front surfaces of the armature disk and of the coil carrier for springs and retaining bushings preferably do not count as pole front surfaces. The stroke (22 in FIG. 7), i.e., the air gap difference between pulled-in (closed position) and dropped position (open position) of the armature disk 7, is preferably in a range of 0.1 mm-2.5 mm in the spring-loaded brakes 1 of the type discussed here. The ratio of the height of the formations on the front surfaces (FIG. 3: the step height) of the internal poles 3, 8 and the external poles 4, 9 due to the varying gradients to the stroke 22 is preferably in the range between 1 to 1 and 4 to 1 for the spring-loaded brakes 1 discussed here. In the preferred embodiment shown in FIG. 3, the step height and the stroke 22 form a ratio of 3 to 1.

Upon movement of the armature disk 7 in the opening direction 12, the air gap 11 becomes smaller and the compression springs 6 are compressed. Upon movement of the armature disk 7 in the closing direction 13, the air gap 11 becomes larger and the compression springs 6 are released. Furthermore, a device 14 for radial guidance of the armature disk 7 is provided.

At least one spacer 15 is also shown which can be arranged between the coil carrier 2 and the armature disk 7. In this case, the basic air gap (16 in FIG. 5b) is the air gap 11 when the armature disk 7 is in open position. When the armature disk 7 is in closed position, this air gap 11 is referred to as the rated air gap (20 in FIG. 5b). The air gap interval between open (basic air gap 16) and closed position (rated air gap 20) of the armature disk 7 defines the stroke region (21 in FIG. 5b) of the spring-loaded brake 1. With at least one spacer 15, the basic air gap 16 becomes larger, and thus the stroke region 21 or the stroke 22 of the armature disk 7 is reduced. The size of the basic air gap 16 is preferably in a range of 0.1-1.5 mm.

Figure 4:
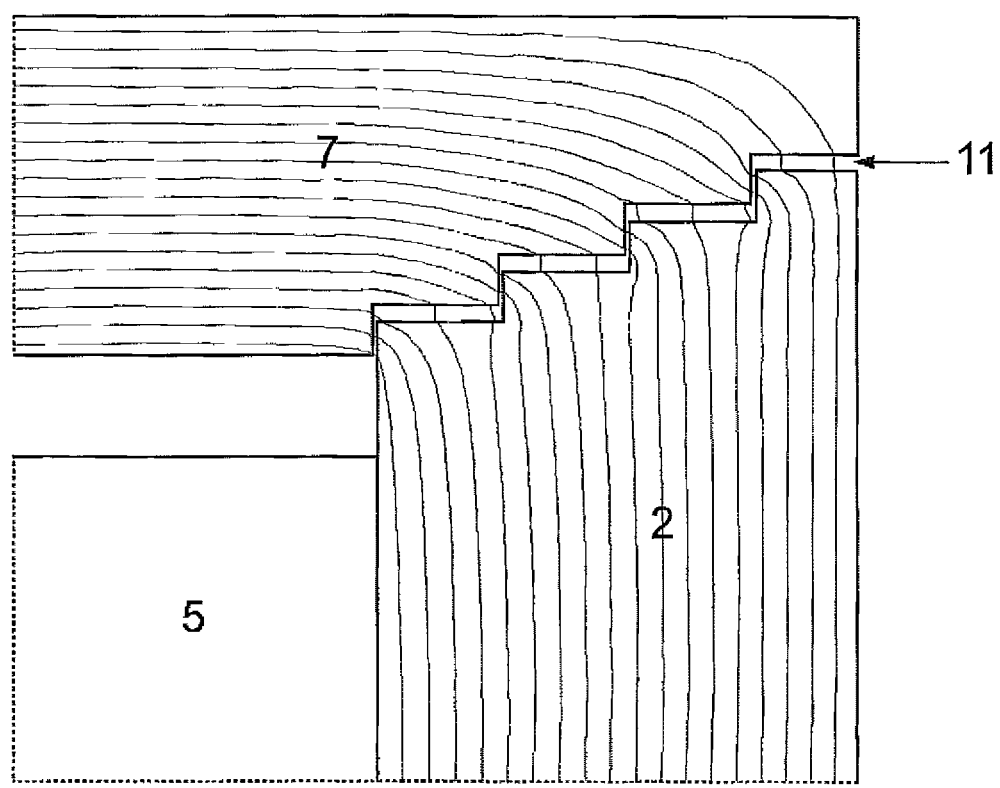
FIG. 4 shows the radial and axial field line profile with a partially open position of armature disk 7 in the spring-loaded brake 1 in the preferred embodiment of a stepped design of the pole surfaces of coil carrier 2 and armature disk 7 of the spring-loaded brake 1 with excited solenoid 5.

FIG. 4 shows the overlapping front surfaces of a stepped coil carrier 2 and a stepped armature disk 7 with an excited solenoid 5 when the armature disk 7 is in a partially open position, wherein the generated radial and axial magnetic field line profile is represented by the surfaces of the coil carrier 2 and the armature disk 7. Because of the radial magnetic field line profile, a radial force acts on the armature disk 7 during the movement in the stroke region 21. For radial guidance of the armature disk 7 during the movement of the armature disk 7 in the stroke region 21, the device 14 for radial guidance of the armature disk 7 is realized in the preferred embodiment by means of a (play-free) spring plate. In a further embodiment, the device 14 for radial guidance is implemented by at least one guide bushing. In a further embodiment, the radial guidance takes place by means of cylinder pins engaging laterally in the armature disk 7, or by threaded pins with balls acting on the armature disk, or with balls between the coil carrier and the armature disk.

Figure 5A:
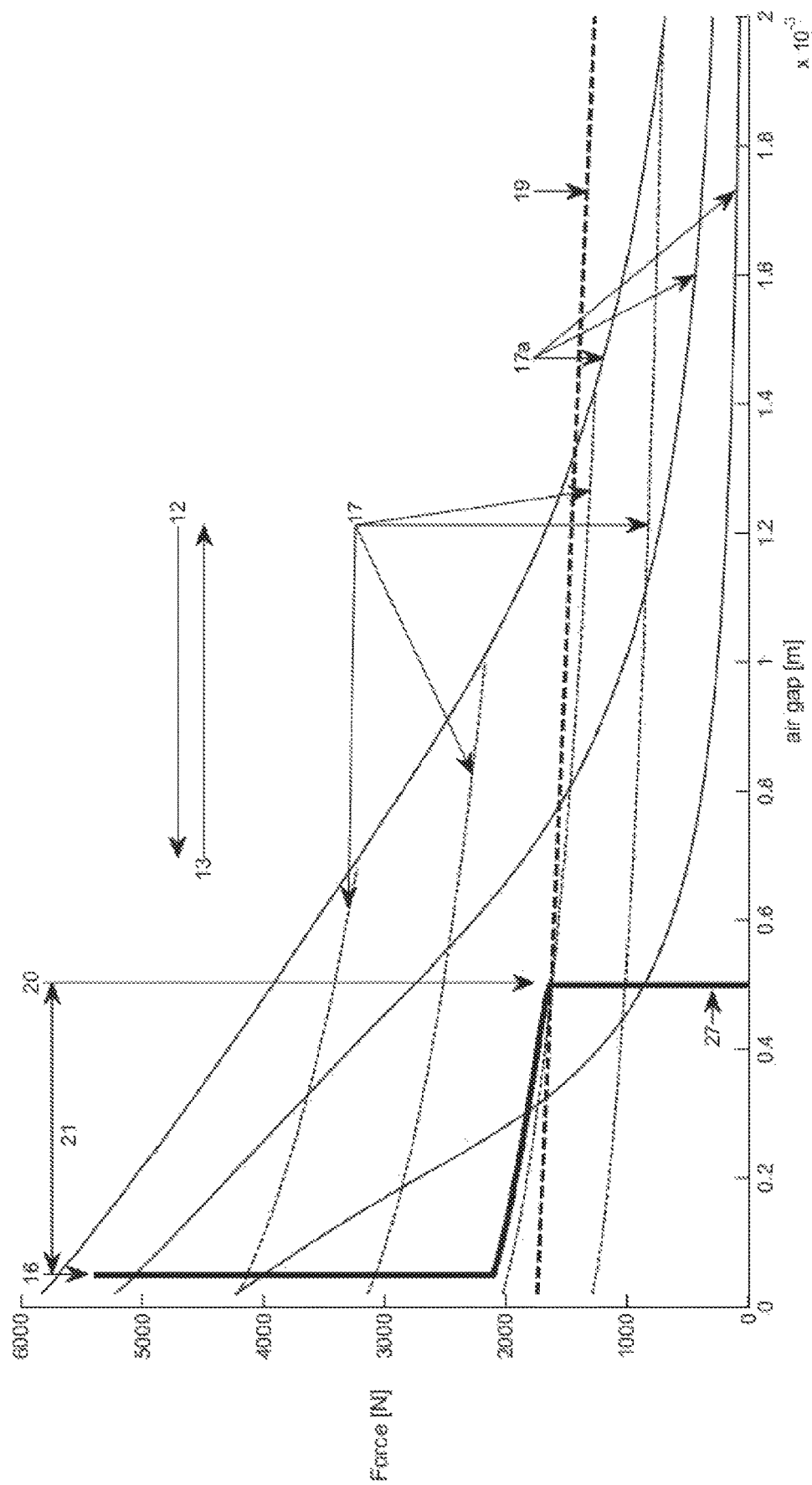
FIG. 5a shows the profile of the magnetic force/air gap characteristic curves at constant linked magnetic flux 17 and at constant current 17a for an air gap interval of a conventional spring-loaded brake for a conventional spring-loaded brake with planar pole surfaces on the coil carrier 2 and the armature disk 7. In addition to the spring force/air gap characteristic curve 19, the movement trajectory 27 for the current feed (excitation of the solenoid) of a conventional spring-loaded brake at nominal voltage can be seen.

FIG. 5a shows the magnetic force/air gap characteristic curves at different constant linked magnetic fluxes 17 continuously decreasing in the closing direction 13 for a stroke region 21 for a conventional spring-loaded brake with planar front surfaces on the coil carrier and the armature disk in the region of the internal poles and the external poles. Magnetic force/air gap characteristic curves at different constant currents 17a are also shown. Furthermore, the spring force/air gap characteristic curve 19 is shown. With sufficient increase/decrease in the excitation or with constant excitation of the solenoid, the armature disk always moves in the stroke region 21 of the conventional spring-loaded brake in the region of a positive feedback between spring force and magnetic force so that the armature disk is increasingly accelerated in its movement to the closed position (rated air gap 20) or open position (basic air gap 16) during each movement in the entire stroke region 21.

Figure 5B:
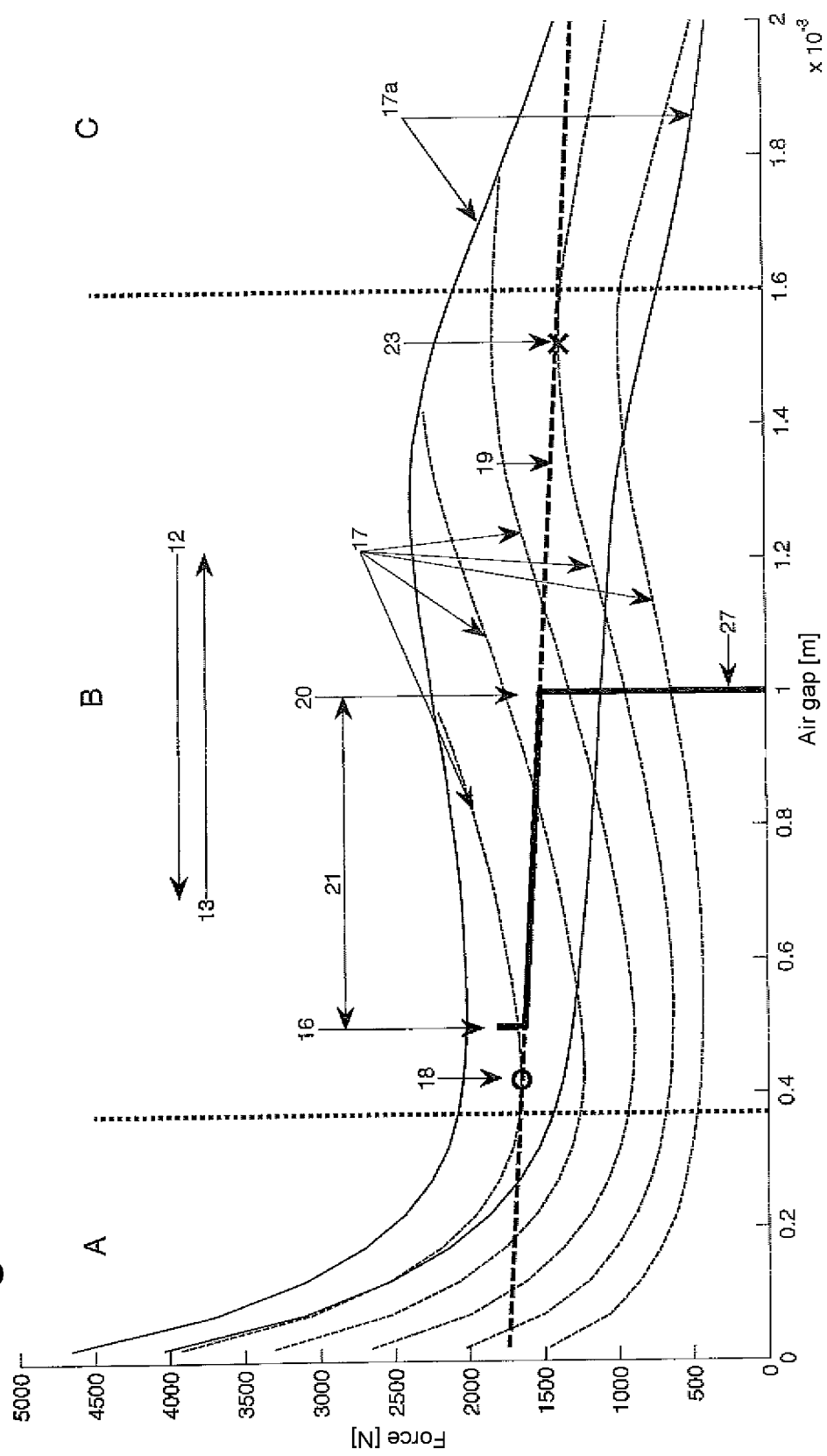
FIG. 5b shows the profile of the magnetic force/air gap characteristic curves at constant linked magnetic flux 17 and at constant current 17a for an air gap interval of a spring-loaded brake 1 with controllable armature disk movement for a preferred embodiment of the spring-loaded brake 1 with stepped pole surfaces on the coil carrier 2 and the armature disk 7. In addition to the spring force/air gap characteristic curve 19, the movement trajectory 27 for the current feed of the spring-loaded brake 1, which works according to the method according to the invention, can be seen.

FIG. 5b shows the magnetic force/air gap characteristic curves at different constant currents 17a and at different constant linked magnetic fluxes 17 for the preferred embodiment shown in FIG. 3. Due to the overlapping front surfaces of the coil carrier 2 and the armature disk 7, the curves for the constant linked magnetic fluxes 17 have a deformed magnetic force distribution in comparison to conventional spring-loaded brakes. The magnetic force/air gap characteristic curves at different constant linked magnetic fluxes 17 in the case of an air gap 11 form a maximum near zero and then have a negative slope in the closing direction 13 with an increasing air gap 11 of the armature disk 7 in order to form a local minimum 18 with an increasing air gap 11, and to thereafter have a positive slope in the closing direction 13 with an increasing air gap 11. Subsequently, the magnetic force/air gap characteristic curve at one constant linked magnetic flux 17 forms a local maximum 23 with an increasing air gap 11 and thereafter has a negative slope in the closing direction 13.

The course of the magnetic force/air gap characteristic curves at different constant linked magnetic fluxes 17 can be varied via the formation of the front surfaces of the internal poles 3, 8 and the external poles 4, 9 of the coil carrier 2 or the armature disk 7.

For example, a greater number of steps than in the embodiment shown in FIG. 3 leads to a steeper course of the magnetic force/air gap characteristic curves at different constant linked magnetic fluxes 17 in the region of negative feedback.

Three regions A, B, and C form for the movement of the armature disk 7. In region A, essentially between zero air gap and the local minimum 18, a region of positive feedback between magnetic force and spring force is formed during the movement of armature disk 7. The positive feedback results in increased acceleration with a decreasing or increasing air gap 11 in the direction of movement. In region B, substantially between local minimum 18 and local maximum 23, a region of negative feedback between magnetic force and spring force forms for the movement of the armature disk 7. The negative feedback results in decreasing acceleration with a decreasing or increasing air gap 11 in the direction of movement. In region C, substantially from the local maximum 23, the armature disk 7 moves in the region of positive feedback between spring force and magnetic force. In this case, the movement of an armature disk in the regions of positive feedback (A, C) is comparable to the situation in a conventional spring-loaded brake.

In this case, the transition between the region A (positive feedback) and the region B (negative feedback) is given by the slope of the magnetic force/air gap characteristic curve at constant linked magnetic flux 17 being greater in the closing direction 13 than the slope of the spring force/air gap characteristic curve 19 in the closing direction 13. The same applies to the transition between the region B (negative feedback) and the region C (positive feedback). The transitions between the individual regions are thus not exactly at the local extreme values 18, 23 of the magnetic force/air gap characteristic curve at constant linked magnetic flux 17, but are rather offset somewhat depending on the slope of the spring force/air gap characteristic curve 19.

With the addition of at least one spacer 15, the stroke region 21 in the spring-loaded brake 1 between the coil carrier 2 and the armature disk 7 can be limited to a smaller air gap interval so that the magnetic force/air gap characteristic curves at different constant linked magnetic fluxes 17 in the region from the spacer 15 have a greater slope in the closing direction 13 of the brake than the spring force/air gap characteristic curve 19. The rated air gap 20 (closed position) can moreover be dimensioned such that it is also in region B (negative feedback) so that the entire stroke region 21 lies in region B.

In one embodiment, the at least one spacer 15 is designed as a plate made of at least partially non-magnetizable material and is mounted on the surface of the coil carrier 2 and/or of the armature disk 7. In a further embodiment, the spacer 15 is a disk arranged on the spacer or guiding elements of the armature disk 7 and made of at least partially non-magnetizable material. In a further embodiment, the spacer or guiding elements 6b are provided as spacers 15, wherein portions of the spacer(s) 15 consist of at least partially non-magnetizable material.

In a further embodiment, at least a part of the spacer 15 consists of a polymer or elastomer and thus serves for additional noise damping during the impact of the armature disk 7 on the spacer 15. A higher impact speed with constant noise development can thus be achieved, which leads to a shortening of the switching time.

The controllable movement of the armature disk 7 due to the deformed magnetic force distribution in the spring-loaded brake 1 is described below based on FIG. 5b. When the spring-loaded brake 1 is opened, the solenoid 5 located in the coil carrier 2 is excited by means of an applied voltage or a flowing current. Due to the excitation of the solenoid, an induced voltage is generated, wherein the induced voltage corresponds to the change in the linked magnetic flux. Thus, a magnetic force acting on the armature disk 7 in the opening direction 12 is generated. The applied voltage or the applied current is further increased until the magnetic force acting on the armature disk 7 is greater than the spring force acting on the armature disk 7. The ratio of magnetic force and spring force acting on the armature disk 7 becomes greater than one so that an accelerating force acts on the armature disk 7, and the armature disk 7 moves from the closed position (rated air gap 20) in the opening direction 12. Since the linked magnetic flux is a state variable of the electromagnetic subsystem of the spring-loaded brake 1 and the value of the magnetic flux thus does not change abruptly for short time intervals, the movement trajectory 27 of the spring-loaded brake 1 for rapid movements of the armature disk initially always follows substantially the magnetic force/air gap characteristic curve at constant linked magnetic flux 17.

If the movement in the case of a rated air gap 20 starts in region C (positive feedback), where the slope of the magnetic force/air gap characteristic curve at constant linked magnetic flux 17 is less than or equal to the slope of the spring force/air gap characteristic curve 19, the armature disk 7 is increasingly accelerated at the beginning of its movement. This applies up to the transition from region C (positive feedback) to region B (negative feedback), where the slope of the magnetic force/air gap characteristic curve at constant linked magnetic flux 17 is greater than the slope of the spring force/air gap characteristic curve 19.

During the movement of the armature disk 7 in region B (negative feedback) or when the movement of the armature disk 7 in the case of a rated air gap 20 starts in region B (negative feedback), the armature disk 7 experiences at constant or slightly changing linked magnetic flux a decreasing accelerating force in the course of the movement up to a restoring force opposite the original movement in the opening direction 12. This restoring force can occur due to the substantially decreasing magnetic force/air gap characteristic curve in the opening direction 12 at constant linked magnetic flux 17 up to the transition from region B (negative feedback) to region A (positive feedback) in connection with the increasing spring force (due to the compression of the springs 6). The movement of the armature disk 7 is thereby decelerated. This corresponds to a ratio of magnetic force and spring force of less than one, which acts on the armature disk 7. This produces a negative feedback between the magnetic force of the solenoid 5 and the spring force of the compression spring 6 during the movement of the armature disk 7 in region B. The position or the movement/speed of the armature disk 7 in the stroke region 21 can be controlled by varying the magnetic force via the linked magnetic flux.

Upon further increasing the linked magnetic flux (by varying the excitation of the solenoid 5 by generating an adjusted induced voltage), the armature disk 7 continues to move in the opening direction 12. This occurs because the magnetic force increases more by increasing the linked magnetic flux than the simultaneously increasing spring force. The armature disk 7 then moves at constant linked magnetic flux 17 on a magnetic force/air gap characteristic curves, which initially lies above the spring force/air gap characteristic curve 19. The movement of the armature disk 7 is continued in an accelerated manner due to a ratio of magnetic force and spring force of greater than one. The magnetic force decreases again due to the movement on the magnetic force/air gap characteristic curves at constant linked magnetic flux 17, and the ratio of magnetic force to spring force becomes less than one again, and the movement of the armature disk 7 is decelerated.

Upon renewed increase of the linked magnetic flux (by varying the excitation of the solenoid by generating an adjusted induced voltage), the armature disk 7 continues the movement in the opening direction 12 again in an accelerated manner.

In this way, the armature disk 7 moves, as shown in FIG. 5c for the movement in the opening direction 12, via at least one acceleration and deceleration cycle, by an adjusted increase of the magnetic flux via typically several acceleration and deceleration cycles, in region B (negative feedback) in the opening direction 12, wherein the ratio of magnetic force and spring force varies between greater than one and less than one. In this case, the movement of the armature disk in region B (negative feedback) can be regarded as a continuous movement of the armature disk 7 because of its dynamics as a sequence of acceleration and deceleration cycles.

In one embodiment of the invention, the movement of the armature disk 7 is continued after the transition to region A (positive feedback) such that the basic air gap 16 is in region A. The armature disk 7 is accelerated again here on account of the steeply increasing magnetic force/air gap characteristic curves 17. The ratio of magnetic force and spring force in region A (positive feedback) again becomes permanently greater than one, and the armature disk is increasingly accelerated until it reaches the open position (basic air gap 16).

In a preferred embodiment, the movement of the armature disk 7 in the opening direction 12 takes place due to at least one spacer 15 in region B (negative feedback). The armature disk 7 is moved via at least one acceleration and deceleration cycle and then reaches the open position (basic air gap 16) at an adjustable speed or at an adjustable time.

After reaching the open position, the magnetic force is further increased by further excitation of the solenoid 5 by increasing the applied voltage or the applied current so that the ratio of magnetic force to spring force after reaching the open position becomes greater than one, and the armature disk 7 is firmly pressed toward the coil carrier 2, and a magnetic force reserve is established in the open position of the armature disk 7 in the spring-loaded brake 1.

When the spring-loaded brake 1 is closed, the solenoid 5 is less excited by reducing the applied voltage or the applied current so that the magnetic force acting on the armature disk 7 decreases. The excitation of the solenoid 5 is reduced until the ratio of magnetic force and spring force acting on the armature disk 7 is less than one, and the armature disk 7 is accelerated in the closing direction 13.

In the case of an embodiment of the spring-loaded brake 1 without spacers 15, the movement of the armature disk 7 in the case of an open position (basic air gap 16) starts in region A (positive feedback), and is increasingly accelerated due to the decreasing magnetic force/air gap characteristic curves at constant magnetic linked flux 17 in the direction of movement (closing direction 13) up to the transition from region A (positive feedback) to region B (negative feedback).

In the case of the preferred embodiment of the spring-loaded brake 1 with a stroke region 21 limited to region B (negative feedback) by spacers 15, where the slope of the magnetic force/air gap characteristic curve at constant linked magnetic flux 17 is greater than the slope of the spring force/air gap characteristic curve 19, the armature disk 7 experiences at constant or slightly changing linked magnetic flux a decreasing accelerating force up to a restoring force in the direction opposite the closing direction 13 due to the increasing magnetic force/air gap characteristic curves at constant linked magnetic flux 17 in the closing direction 13. This corresponds to a magnetic force to spring force ratio of greater than one. Thus, there is again a negative feedback between the magnetic force of the solenoid 5 and the spring force of the compression springs 6 during the movement of the armature disk 7. This is also the case for the embodiment without spacers 15, wherein the negative feedback only starts here after the transition from region A (positive feedback) to region B (negative feedback). The position or the movement or speed of the armature disk 7 in the stroke region 21 can be controlled by varying the magnetic force via the linked magnetic flux.

Upon further decrease of the linked magnetic flux (by varying the excitation of the solenoid 5 by generating an adjusted induced voltage), the armature disk 7 continues to move in the closing direction 13. This occurs because the magnetic force decreases more by decreasing the excitation of the solenoid 5 than the simultaneously decreasing spring force. The armature disk 7 moves at constant linked magnetic flux 17 on a magnetic force/air gap characteristic curve which lies below the spring force/air gap characteristic curve 19. The movement of the armature disk 7 is then continued in an accelerated manner due to the ratio of magnetic force and spring force of less than one.

Due to the movement in the closing direction 13, the magnetic force increases again on the magnetic force/air gap characteristic curve at constant linked magnetic flux 17, and the ratio of magnetic force to spring force becomes greater than one again, and the movement of the armature disk 7 is decelerated.

Upon further decrease of the linked magnetic flux (by varying the excitation of the solenoid 5 by generating an adjusted induced voltage), the armature disk 7 continues to again move in the closing direction 13 in an accelerated manner.

In this way, the armature disk 7 moves, as shown in FIG. 5c for the movement in the closing direction 13, over at least one acceleration and deceleration cycle, by further reducing the magnetic flux over typically several acceleration and deceleration cycles, in region B (negative feedback) in the closing direction 13, wherein the ratio of magnetic force and spring force varies between greater than one and less than one. In this case, the movement of the armature disk 7 in the stroke region 21 can be regarded as a continuous armature disk movement because of its dynamics as a sequence of acceleration and deceleration cycles.

In one embodiment of the invention, the closed position (rated air gap 20) is in region C (positive feedback). The movement is continued in the transition from region B (negative feedback) to region C (positive feedback). The ratio of magnetic force and spring force becomes less than one, and the armature disk is increasingly accelerated once again until the rated air gap 20 is reached.

In a preferred embodiment, the movement of the armature disk in the closing direction 13 up to a rated air gap 20 takes place in region B (negative feedback).

The armature disk 7 is moved over at least one acceleration and deceleration cycle and then reaches the rated air gap 20 of the spring-loaded brake 1 at an adjustable speed or at an adjustable time. Subsequently, the excitation of the solenoid 5 is further reduced by reducing the voltage or the current until the ratio of magnetic force and spring force is close to zero, which corresponds to a zero voltage or no current.

When an electromagnetically released spring-loaded brake 1 is closed, a further adjustment possibility results in the method presented here. The ratio between magnetic force and spring force can be adjustably changed by varying the excitation of the solenoid 5 during the movement of the armature disk 7 in region B (negative feedback) between magnetic force and spring force. As a result of the adjustably changing linked magnetic flux, the ratio of magnetic force to spring force varies between greater than one, less than one, and equal to one. An adjustable force can then be applied to the armature disk 7. Furthermore, due to variations of the excitation of the solenoid 5, the ratio between magnetic force and spring force can be varied between less than or equal to one in the closed position of the spring-loaded brake 1 so that a variable force for adjusting a defined torque of the spring-loaded brake is applied.

Figure 6:
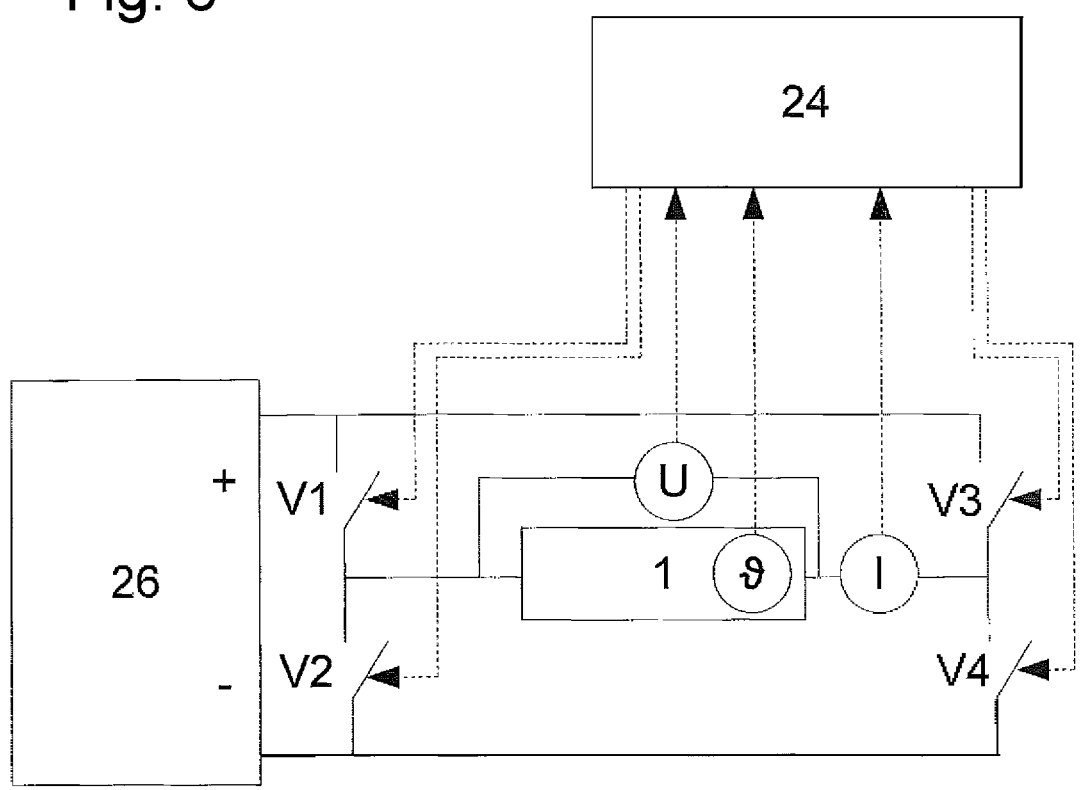
FIG. 6 shows a possibility for operating a spring-loaded brake 1 using a full bridge with switches V1, V2, V3, V4, an electronic control unit 24 (e.g., microcontroller), and a voltage supply 26.

FIG. 6 furthermore shows a possible way of controlling the operation of the spring-loaded brake 1. This can be a full bridge with four switches 25 controlled by an electronic control unit 24 (e.g., microcontroller). Depending on the embodiment, the switch V3 can be omitted, or the switch V4 can be replaced by a short-circuit bridge. The voltage from the voltage supply 26 can be controlled using these switches in such a way that various current and/or voltage curves can be applied to the brake. As a preferred alternative, an analog power output stage can be used instead of the full bridge.

The voltage applied to the brake and the current flowing through the brake are available to the electronic control unit 24 (e.g., microcontroller) via current and voltage sensors. In one embodiment, the coil temperature is available to the electric control unit via a temperature sensor Θ in order to be able to detect temperature-related resistance changes and evaluate them in the controller.

Figure 7:
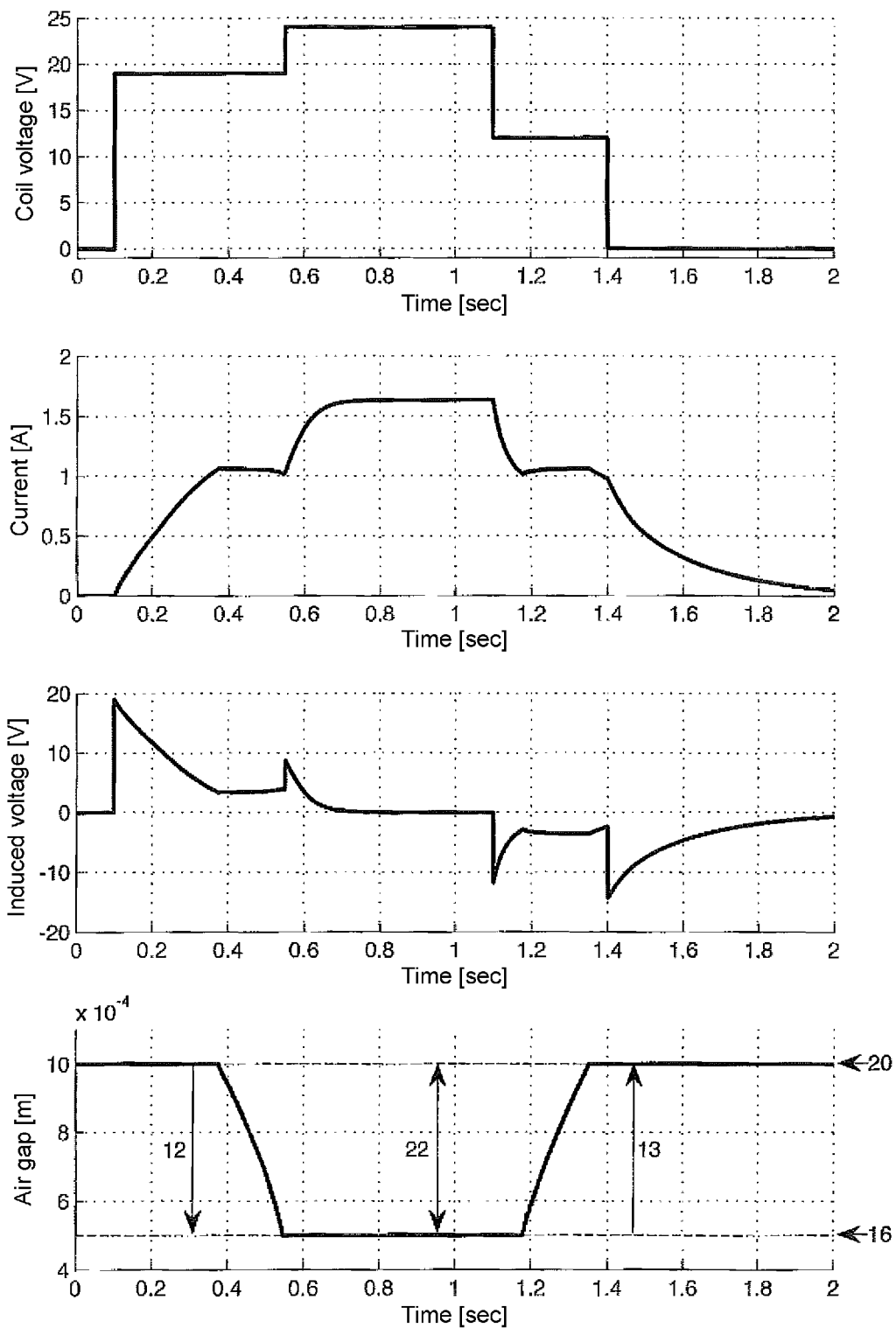
FIG. 7 shows a possible operating mode of the electromagnetic spring-loaded brake 1, wherein the excitation of the solenoid 5 is varied by means of an intermediate voltage level. Furthermore, the associated current flow, the voltage induced in the solenoid 5, and the variation of the air gap (11) during opening and closing of the brake are plotted for this operating mode.

FIG. 7 shows a variation type of the coil voltage excitation in a solenoid 5 of the spring-loaded brake 1 for controlling the armature disk 7 in the stroke region 21; next to it are also shown a simultaneous current measurement, the induced voltage calculated from current and voltage, and the variation of the air gap 11 during the excitation of the solenoid 5. In this case, the solenoid 5 is excited by means of a first voltage jump to a first voltage, for example to +19 V, and then in a second voltage jump, for example, to a voltage of +24 V. This intermediate voltage level results in a positive induced voltage in the solenoid 5, which voltage drops over time as the current flow increases with time. The movement of the armature disk 7 in the opening direction 12 from the rated air gap 20 to the basic air gap 16 as shown in the representation of the variation of the air gap 11 takes place at small values of the induced voltage and is visible in the current measurement by a negative current slope. The second voltage jump in turn causes a jump in the induced voltage, which drops over time and simultaneously generates an increasing current flow, wherein the second voltage jump starts upon or after reaching the basic air gap 16 and generates a magnetic force reserve of the brake in the open position.

When reducing the excitation of the solenoid 5, the brake voltage is set to, for example, 12 V by means of a voltage jump. Thus, a negative induced voltage is generated in the solenoid 5 which decreases in magnitude over time while the current flow decreases with time. The actual movement of the armature disk 7 from the basic air gap 16 to the rated air gap 20 in the closing direction 13 as shown in the representation of the variation of the air gap 11 takes place at small values of the induced voltage and is visible here in the current measurement by a positive current slope. The voltage is then set to 0 so that almost no magnetic force acts on the armature disk 7 from the solenoid 5 after reaching the rated air gap 20.

In this case, it is advantageous for the control of the armature disk 7 in the brake in the preferred embodiment if the magnitude of the induced voltage during the movement of the armature disk 7 assumes a value in the range from 0 to 1.5 times the static pull-in voltage of the spring-loaded brake 1 so that the spring force and the magnetic force are in a force ratio such that the impact speed of the armature disk is only high enough to achieve sufficient noise damping for the respective application.

Another operating mode for the variable excitation of a solenoid 5 in an electromagnetic brake 1 with a controllable armature disk 7 is to start a voltage ramp or a current ramp, or to generate a suitable constant induced voltage at the solenoid 5. A further operating mode is to excite the solenoid 5 by means of a plurality of voltage jumps. A further operating mode is the conventional application of a voltage jump to rated voltage or over-excitation voltage. A still further operating mode is to excite the solenoid 5 by means of at least one voltage jump and to subsequently further increase the variable excitation of a solenoid 5 by means of a current or voltage ramp. Depending on the operating mode of the spring-loaded brake 1, the ohmic resistance of the solenoid 5 is determined before the variable excitation of the solenoid 5.

When reducing the excitation of the solenoid 5, corresponding operating modes are possible in order to reduce the magnetic force and to move the armature disk 7 in a controllable manner in the closing direction 13.

The invention claimed is:

1. Method for controlling an electromagnetically released brake comprising a coil carrier having an internal pole and an external pole, a solenoid, an armature disk having an internal pole and an external pole, and at least one further force-exerting element, wherein:
   the internal pole and the external pole of the coil carrier each have a front surface with a varying gradient;
   front surfaces of the internal pole and the external pole of the armature disk each fit, in a complementary fashion, the front surfaces of the respective internal pole and external pole of the coil carrier;
   the coil carrier and the armature disk define an air gap which varies in size and forms a stroke region between a basic air gap and a rated air gap; and
   the method comprises:
   the solenoid generating a magnetic force upon excitation; and
   the force-exerting element generating a second force opposite the magnetic force of the solenoid, wherein:
   the ratio of the magnetic force of the solenoid and the second force of the force-exerting element during the movement of the armature disk in the stroke region varies at least once between greater than one and less than one due to an appropriate excitation of the solenoid; and
   during the movement of the armature disk in the stroke region, the ratio between the magnetic force of the solenoid and the second force of the force-exerting element varies between greater than one, less than one, and equal to one due to a suitable excitation of the solenoid so that a variable force is applied to the armature disk.

2. The method for controlling an electromagnetically released brake according to claim 1, wherein:
   when opening the brake by suitable excitation of the solenoid, a magnetic force is generated so that the ratio of the magnetic force of the solenoid and the second force of the force-exerting element becomes greater than one, and the armature disk is accelerated from the rated air gap in the opening direction;
   the excitation of the solenoid is further increased during the movement of the armature disk in the stroke region, and the ratio of the magnetic force of the solenoid and the second force of the force-exerting element is at least once less than one, and the armature disk is decelerated at least once and reaches the basic air gap at an adjustable speed;
   the excitation of the solenoid is further increased so that the ratio of the magnetic force of the solenoid and the second force of the force-exerting element after the end of the movement is again greater than one;
   when the brake is closed by varying the excitation of the solenoid, the magnetic force is reduced so that the ratio of the magnetic force of the solenoid and the second force of the force-exerting element becomes less than one, and the armature disk is accelerated from the basic air gap in the closing direction;
   the excitation of the solenoid is further reduced during the movement of the armature disk in the stroke region, and the ratio of the magnetic force of the solenoid and the second force of the force-exerting element is at least once greater than one, and the armature disk is decelerated at least once, and the armature disk reaches the rated air gap at an adjustable speed; and
   the excitation of the solenoid is further reduced until the ratio of the magnetic force and the second force of the force-exerting element is close to zero.

3. The method for controlling an electromagnetically released brake according to claim 1, wherein the front surfaces of the internal and external poles of the armature disk have varying gradients that are complementary to the varying gradients of the front surfaces of the internal and external poles of the coil carrier.

4. The method for controlling an electromagnetically released brake according to claim 1, wherein, when the brake is closed, the ratio between the magnetic force of the solenoid and the second force of the force-exerting element is less than or equal to one due to variations in the excitation of the solenoid so that a variable force for setting a defined torque of the brake is applied to the armature disk.

5. The method for controlling an electromagnetically released brake according to claim 1, wherein the ratio of the height difference on the front surface of the coil carrier or of the armature disk to the stroke is in the range from 1.0 to 4.0.

6. The method for controlling an electromagnetically released brake according to claim 1, wherein at least one spacer is mounted between the coil carrier and the armature disk on the pole front surfaces of the coil carrier and/or on the pole front surfaces of the armature disk so that the stroke region is reduced.

7. The method for controlling an electromagnetically released brake according to claim 6, wherein the at least one spacer is a plate of non-magnetizable material arranged on the pole front surfaces of the coil carrier and/or on the pole front surfaces of the armature disk.

8. The method for controlling an electromagnetically released brake according to claim 6, wherein the at least one spacer is a disk of at least partially non-magnetizable material arranged on spacer or guiding elements of the armature disk.

9. The method for controlling an electromagnetically released brake according to claim 6, wherein spacer or guiding elements are provided as the at least one spacer and consist at least partially of non-magnetizable material.

10. The method for controlling an electromagnetically released brake according to claim 6, wherein the at least one spacer consists of a non-magnetizable polymer material and assumes an additional function of a simple mechanical damper.

11. The method for controlling an electromagnetically released brake according to claim 1, wherein, during the movement of the armature disk, the magnitude of induced voltage assumes a value in the range from 0 to 1.5 times a static determined pull-in voltage of the brake.

12. The method for controlling an electromagnetically released brake according to claim 1, wherein the excitation of the solenoid is varied by means of one or more voltage jumps.

13. The method for controlling an electromagnetically released brake according to claim 1, wherein the excitation of the solenoid is varied by means of a voltage ramp.

14. The method for controlling an electromagnetically released brake according to claim 1, wherein the excitation of the solenoid is varied by means of one or more voltage jumps in connection with a current or voltage ramp.

15. The method for controlling an electromagnetically released brake according to claim 1, wherein the excitation of the solenoid is varied by means of a current ramp.

16. The method for controlling an electromagnetically released brake according to claim 1, wherein the front surfaces of the internal pole and of the external pole of the coil carrier or of the armature disk have one or more steps or one or more notches and projections.

17. The method for controlling an electromagnetically released brake according to claim 16, wherein the one or more steps or the one or more notches and projections of the coil carrier or of the armature disk have an edge or edges parallel to the opening direction.

18. The method for controlling an electromagnetically released brake according to claim 16, wherein the one or more steps or the one or more notches and projections of the coil carrier or of the armature disk have an edge or edges oblique to the opening direction.

19. The method for controlling an electromagnetically released brake according to claim 1, wherein the front surfaces of the internal pole and the external pole of the coil carrier have one or more steps or one or more notches and projections, and the front surfaces of the internal pole and the external pole of the armature disk have one or more steps or notches and projections that fit the coil carrier in a complementary fashion.

20. The method for controlling an electromagnetically released brake according to claim 1, wherein the varying gradients on the front surfaces of the coil carrier and of the armature disk have the shape of circles extending concentrically with a central axis of the brake.

21. The method for controlling an electromagnetically released brake according to claim 1, wherein the varying gradients on the front surfaces of the coil carrier and of the armature disk are arranged in the form of stepped bores on a pitch circle concentric with a central axis of the brake.

22. The method for controlling an electromagnetically released brake according to claim 1, wherein the varying gradients are arranged on the front surfaces of the coil carrier and of the armature disk, and that the contour of the front surfaces follows substantially parallel to contour of the coil carrier and/or of the armature disk.

23. The method for controlling an electromagnetically released brake according to claim 1, wherein the varying gradients are arranged on the front surface of the coil carrier or of the armature disk, and that contour of the front surface follows substantially parallel to contour of the coil space of the coil carrier.

24. The method for controlling an electromagnetically released brake according to claim 1, wherein the varying gradients are arranged on the front surface of the coil carrier or of the armature disk, and that contour of the front surface follows any geometry between the coil space and contour of the coil carrier.

25. The method for controlling an electromagnetically released brake according to claim 1, wherein the brake has a device for radial guidance of the armature disk.

26. The method for controlling an electromagnetically released brake according to claim 25, wherein the device for radial guidance of the armature disk is a play-free spring plate.

27. The method for controlling an electromagnetically released brake according to claim 25, wherein the device for radial guidance of the armature disk has one or more guide bushings.

28. The method for controlling an electromagnetically released brake according to claim 25, wherein the device for radial guidance of the armature disk takes place by means of cylinder pins engaging in the armature disk.

29. The method for controlling an electromagnetically released brake according to claim 25, wherein the device for radial guidance of the armature disk has threaded pins with balls acting on the armature disk.

30. The method for controlling an electromagnetically released brake according to claim 25, wherein the device for radial guidance of the armature disk consists of balls which are arranged between the coil carrier and the armature disk.

31. The method for controlling an electromagnetically released brake according to claim 1, wherein the at least one further force-exerting element is at least one compression spring located on the coil carrier, and the second force is a spring force which is opposite the magnetic force of the solenoid.

32. The method for controlling an electromagnetically released brake according to claim 1, wherein the at least one further force-exerting element is a return spring, and the second force is a spring force which is opposite the resulting magnetic force from the permanent magnet and solenoid.

33. Method for controlling an electromagnetically released brake comprising a coil carrier having an internal pole and an external pole, a solenoid, an armature disk having an internal pole and an external pole, and at least one further force-exerting element, wherein:
  the internal pole and the external pole of the coil carrier each have a front surface with a varying gradient;
  front surfaces of the internal pole and the external pole of the armature disk each fit, in a complementary fashion, the front surfaces of the respective internal pole and external pole of the coil carrier;
  the coil carrier and the armature disk define an air gap which varies in size and forms a stroke region between a basic air gap and a rated air gap; and
  the method comprises:
    the solenoid generating a magnetic force upon excitation; and
    the force-exerting element generating a second force opposite the magnetic force of the solenoid, wherein:
      the ratio of the magnetic force of the solenoid and the second force of the force-exerting element during the movement of the armature disk in the stroke region varies at least once between greater than one and less than one due to an appropriate excitation of the solenoid;

when opening the brake by suitable excitation of the solenoid, a magnetic force is generated so that the ratio of the magnetic force of the solenoid and the second force of the force-exerting element becomes greater than one, and the armature disk is accelerated from the rated air gap in the opening direction;

the excitation of the solenoid is further increased during the movement of the armature disk in the stroke region, and the ratio of the magnetic force of the solenoid and the second force of the force-exerting element is at least once less than one, and the armature disk is decelerated at least once and reaches the basic air gap at an adjustable speed;

the excitation of the solenoid is further increased so that the ratio of the magnetic force of the solenoid and the second force of the force-exerting element after the end of the movement is again greater than one;

when the brake is closed by varying the excitation of the solenoid, the magnetic force is reduced so that the ratio of the magnetic force of the solenoid and the second force of the force-exerting element becomes less than one, and the armature disk is accelerated from the basic air gap in the closing direction;

the excitation of the solenoid is further reduced during the movement of the armature disk in the stroke region, and the ratio of the magnetic force of the solenoid and the second force of the force-exerting element is at least once greater than one, and the armature disk is decelerated at least once, and the armature disk reaches the rated air gap at an adjustable speed; and the excitation of the solenoid is further reduced until the ratio of the magnetic force and the second force of the force-exerting element is close to zero.

34. Method for controlling an electromagnetically released brake comprising a coil carrier having an internal pole and an external pole, a solenoid, an armature disk having an internal pole and an external pole, and at least one further force-exerting element, wherein:

the internal pole and the external pole of the coil carrier each have a front surface with a varying gradient;

front surfaces of the internal pole and the external pole of the armature disk each fit, in a complementary fashion, the front surfaces of the respective internal pole and external pole of the coil carrier;

the coil carrier and the armature disk define an air gap which varies in size and forms a stroke region between a basic air gap and a rated air gap; and the method comprises:

the solenoid generating a magnetic force upon excitation; and the force-exerting element generating a second force opposite the magnetic force of the solenoid, wherein:

the ratio of the magnetic force of the solenoid and the second force of the force-exerting element during the movement of the armature disk in the stroke region varies at least once between greater than one and less than one due to an appropriate excitation of the solenoid;

the brake has a device for radial guidance of the armature disk; and the device for radial guidance of the armature disk is a play-free spring plate.

* * * * *